(12) United States Patent
Sasaki et al.

(10) Patent No.: US 6,864,014 B2
(45) Date of Patent: Mar. 8, 2005

(54) CONNECTING STRUCTURE OF CONDUCTIVE CONNECTING TAB OF BATTERY

(75) Inventors: Yoshiyuki Sasaki, Utsunomiya (JP); Yasuyuki Suzuki, Utsunomiya (JP)

(73) Assignee: NEC Tokin Tochigi, Ltd., Utsunomiya (JP)

(*) Notice: Subject to any disclaimer, the term of this patent is extended or adjusted under 35 U.S.C. 154(b) by 375 days.

(21) Appl. No.: 10/044,977

(22) Filed: Jan. 15, 2002

(65) Prior Publication Data

US 2002/0094477 A1 Jul. 18, 2002

(30) Foreign Application Priority Data

Jan. 17, 2001 (JP) ........................................ 2001-009131

(51) Int. Cl.⁷ ................................................ H01M 2/22
(52) U.S. Cl. ........................ 429/170; 429/171; 429/178; 429/181; 219/93
(58) Field of Search ................................ 429/170, 171, 429/178, 179, 177, 181, 211; 219/93, 94, 86.1

(56) References Cited

U.S. PATENT DOCUMENTS 4,495,397 A * 1/1985 Opprecht et al. ............. 219/93
5,935,731 A * 8/1999 Nagaura ....................... 429/174

* cited by examiner

Primary Examiner—Michael Barr
Assistant Examiner—Monique Wills
(74) Attorney, Agent, or Firm—Westerman, Hattori, Daniels & Adrian, LLP

(57) ABSTRACT

The present invention provides a conductive connecting structure exhibiting satisfactory connecting performance to connect a conductive connecting tab being mounted on a battery element to a battery case, said conductive connecting table of the battery is connected to inner wall surface of the battery case or to inner surface of the battery housing, said conductive connecting tab with a plurality of bumps for projection welding is positioned face-to-face to inner wall surface of the battery case or to inner surface of the battery housing, and projection welding is performed to connect the tab.

4 Claims, 3 Drawing Sheets

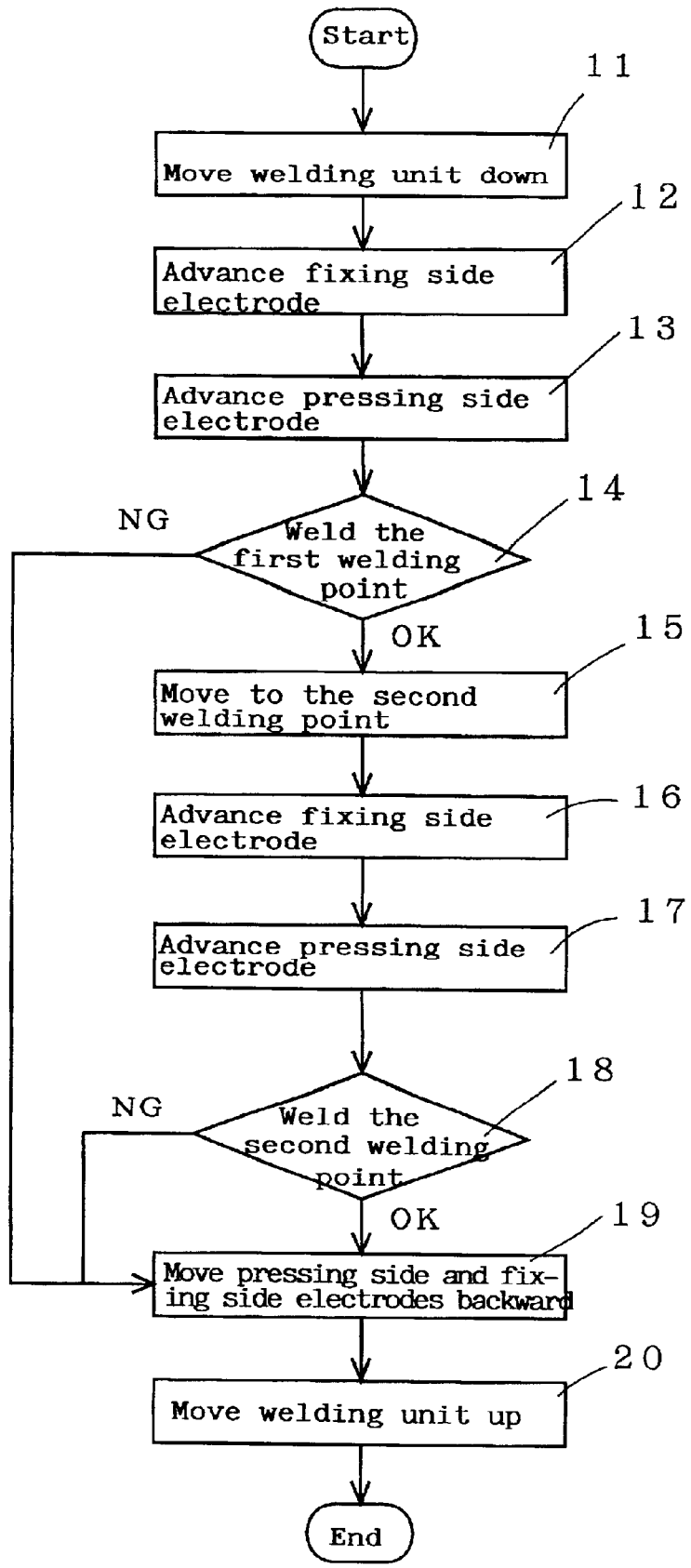

US 6,864,014 B2

CONNECTING STRUCTURE OF CONDUCTIVE CONNECTING TAB OF BATTERY

BACKGROUND OF THE INVENTION

The present invention relates to a connecting structure to connect a conductive connecting tab to a battery case.

The invention relates to formation of conductive connection with high reliability, which shows high connecting strength when a conductive connecting tab is connected to the battery case. The invention relates to a conductive connecting structure, which reduces consumption of welding electrodes when the connection is formed and which contributes to stable production of a large quantity of batteries.

Various types of batteries are now used as power sources for small-size electronic devices. A nonaqueous electrolyte battery such as lithium ion secondary battery, i.e. a small-size large-capacity sealed battery, is used as the power source for portable telephone, note-book size personal computer, camcorder, etc. The nonaqueous electrolyte batteries are generally designed in cylindrical shape or rectangular shape.

In the lithium ion battery used as the power source of small-size electronic device, active material is coated on each of a positive electrode current collector and a negative electrode current collector. Then, these are wound up together with a separator between them, and this is placed in a battery case and is sealed.

In particular, a device using battery is generally provided with a battery receptacle or a battery chamber designed in form of rectangular parallelepiped. When a battery of cylindrical shape is placed in such battery receptacle, there has been such a problem that ineffective or useless space is increased. Further, the cylindrical shape is limited because of the thickness of the battery receptacle. Thus, in s small-size or thin-type device, a thin rectangular battery of prismatic shape is now used.

In a rectangular type nonaqueous electrolyte secondary battery, a battery case made of a material such as stainless steel or nickel-plated soft steel is widely used.

When a metal case made of stainless steel, soft steel, etc. is used as the battery case, a nickel-made negative electrode conductive tab mounted on a battery element is connected to inner wall surface of the battery case. The conductive tab made of nickel used as the negative electrode conductive tab shows generally good connecting performance with soft steel in resistance welding, while there have been strong demands on the improvement of the connecting performance.

When the battery is inadvertently dropped down, connecting points may be ruptured. For instance, strong force is often applied on the connecting portion between the negative electrode conductive tab and the inner wall surface of the battery case due to inertial force from the battery element. In this respect, it has been generally practiced to connect the conductive connecting tab at a plurality of points to reduce the conductive connecting resistance and to increase the strength of the connected portion.

FIG. 3 is a flow chart to explain a process to connect a conductive connecting tab to the inner wall surface of the battery case made of nickel-plated soft steel as used in the past. In this case, welding is performed at two points.

After the battery case is placed at a predetermined point on a welding apparatus, a welding unit is moved down in Step 11. Next, in Step 12, a fixing side electrode is advanced and is moved toward outer wall surface of the battery case. In Step 13, the pressing side electrode is advanced and is moved toward the surface of the conductive connecting tab. In Step 14, a point to be welded is sandwiched from both sides and welding current is supplied, and welding is performed on this first welding point.

When the welding at the first point has been performed satisfactorily, the welding unit is moved to a second welding point. In Step 16, the fixing side electrode is advanced and is moved to outer wall surface of the battery case. Next, in Step 17, the pressing side electrode is advanced and moved toward the surface of the connecting tab. In Step 18, the point to be welded is sandwiched from both sides, and welding current is supplied, and welding is performed on the second welding point.

Next, in Step 19, the pressing side and the fixing side electrodes are moved backward. In Step 20, the welding unit is moved up. The welding operation is completed, and the battery case is taken out.

In Step 14, when welding at the first welding point has been incomplete or poorly performed or the welding at the second welding point was not satisfactory, the pressing side and the fixing side electrodes are moved backward in Step 19. The welding unit is moved up, and the poorly welded product is then taken out.

As described above, in the resistance welding as practiced in the past, electric current is concentrated to the welding point by using a welding electrode having small contact area with the welding point. An electrode of about 2 mm in diameter has been used as the fixing side electrode, and an electrode of about 1×1 mm (length×width) has been used as the pressing side electrode. When the electrode with small contact area is used, electrode tip is very likely to be damaged due to heating or pressing force during the welding operation. When welding is repeatedly performed, the condition for the welding would become poorer compared with the condition in early stage of welding, and the welding electrode must be replaced as early as possible.

To solve the above problems, it is an object of the present invention to provide a battery, by which it is possible to connect the conductive connecting tab mounted on the battery element to inner wall surface of the battery case or to the battery housing at a plurality of welding points and to provide high reliability in conductive connection.

SUMMARY OF THE INVENTION

The present invention provides a connecting structure of a conductive connecting tab of a battery, said conductive connecting tab mounted on a battery element and connected to inner wall surface of a battery case or to inner surface of a battery housing, a plurality of bumps for projection welding of said conductive connecting tab being positioned face-to-face to inner wall surface of the battery case or to the surface of the battery housing, and projection welding is performed to connect the tab.

Also, the present invention provides a method for forming a connecting structure of a conductive connecting tab of a battery, the conductive connecting tab being mounted on a battery element, said method comprising the steps of forming a plurality of bumps for projection welding on the conductive connecting tab, positioning said bumps face-to-face to inner wall surface of the battery case or to inner surface of the battery housing, and supplying welding current under the condition that a pair of electrodes are pressed on welding points, said pair of electrodes having contact areas larger than areas of portions where said plurality of bumps are positioned.

BRIEF DESCRIPTION OF THE DRAWINGS

FIG. 3 is a flow chart to explain a process to connect a conductive connecting tab to inner wall surface of a conventional type battery case made of nickel-plated soft steel.

Figure 1:
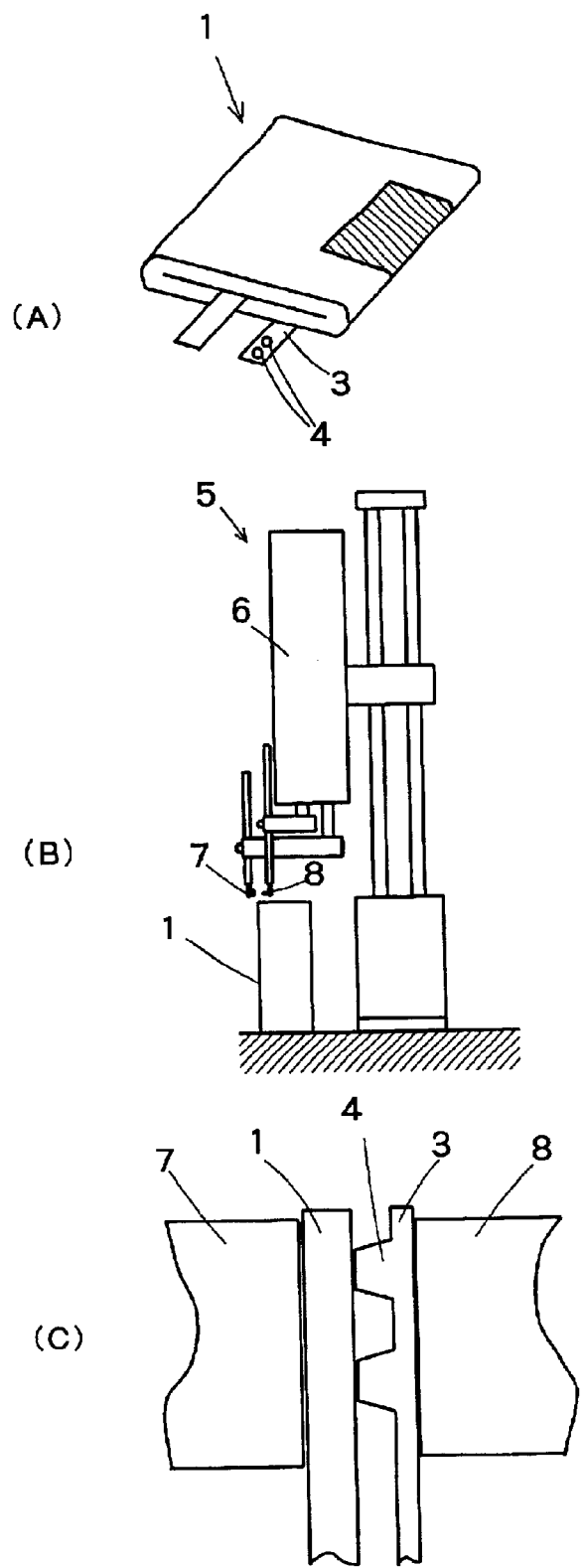
FIG. 1 represents drawings to explain a process to connect a conductive connecting structure to inner wall surface of a battery case according to the present invention.

In the figure, reference numeral 1 denotes a battery case, 2 a battery element, 3 a conductive connecting tab, 4 a bump for projection welding, 5 a welding apparatus, 6 a welding unit, 7 a fixing side electrode, and 8 a pressing side electrode.

DESCRIPTION OF THE PREFERRED EMBODIMENT

According to the present invention, a conductive connecting tab mounted on a battery element is connected to inner wall surface of a battery case or to inner surface of a battery housing. First, a plurality of bumps for projection welding are formed on the conductive connecting tab. Then, the bumps for projection welding are brought into contact with inner wall surface of the battery case. All of the bumps are welded by projection welding using welding electrodes. By single welding operation, welding can be performed at a plurality of points, and welding is achievable in superb manner in both joining strength and electrical characteristics.

Description will be given below on the features of the present invention referring to the drawings.

FIG. 1 represents drawings to explain a process to connect the conductive connecting structure to inner wall surface of the battery case according to the present invention.

As shown in FIG. 1(A), a plurality of bumps 4 for projection welding are formed on the conductive connecting tab 3 mounted on a battery element 2 using a metal mold for press molding.

Net, as shown in FIG. 1(B), the battery element 2 is placed in a battery case 1, and this is placed at a given point on a welding apparatus 5. Then, a welding unit 6 is moved down, and a fixing side electrode 7 and a pressing side electrode 8 are moved forward and these electrodes sandwich the welding point. FIG. 1(C) is an enlarge view. When electric current is supplied to the welding point held by the electrodes, welding current is intensively supplied to the bumps for projection welding. Then, nuggets are formed satisfactorily, and welding is completed.

Figure 2:
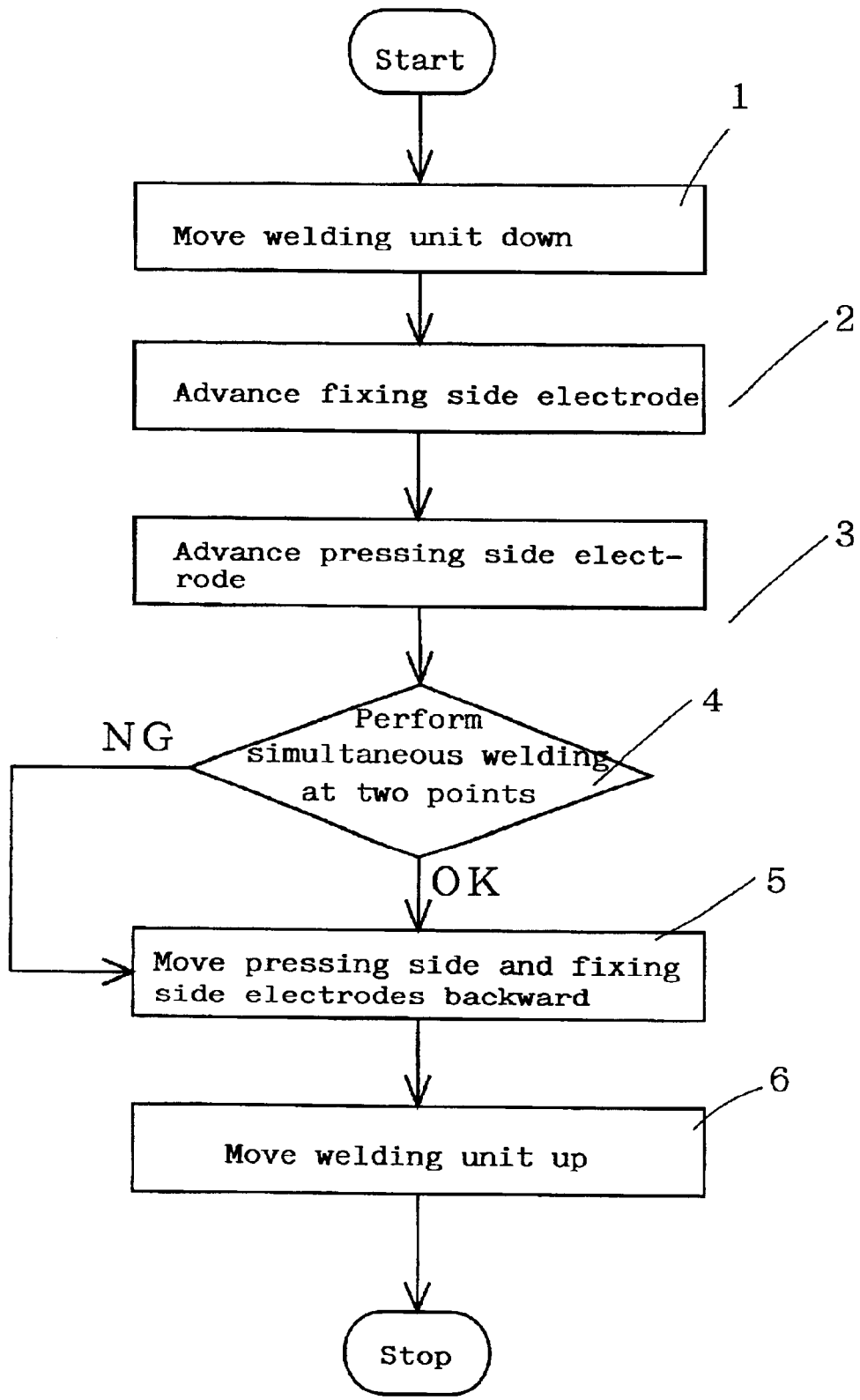
FIG. 2 is a flow chart to explain a welding process according to the present invention.

FIG. 2 is a flow chart to explain welding process of the present invention.

The bumps for projection welding are formed on the conductive connecting tab, which is mounted on the battery element. Then, the battery case with the battery element is placed at a given point on the welding apparatus, and the welding unit is moved down in Step 1. Next, in Step 2, the fixing side electrode is advanced and is moved toward outer wall surface of the battery case. In Step 3, the pressing side electrode is advanced and is moved toward the surface of the conductive connecting tab. In Step 4, the welding point is sandwiched from both sides, and welding current is supplied. As a result, electric current is supplied through said plurality of bumps for welding, and welding is performed.

Next, in Step 5, the pressing side and the fixing side electrodes are moved backward. In Step 6, the welding unit is moved up. Welding operation is completed, and the battery case is taken out.

When welding is incomplete or poorly performed in Step 4, the pressing side and the fixing side electrodes are moved backward in Step 5. The welding unit is moved up, and the poorly welded product is removed.

Taking an example on a case where thickness of the tab is 100 µm, the bumps for projection welding to form the connecting structure of the present invention has preferably a height of 0.13–0.34 mm when it is measured from opposite surface of the conductive connecting tab, or more preferably, 0.15–0.30 mm. The diameter of the projection on the surface of the conductive connecting tab is preferably in the range of 0.5–0.10 mm, or more preferably in the range of 0.7–0.9 mm.

In the connecting structure of the present invention, said plurality of bumps for projection welding are preferably formed with the same height. Even in case there may be some differences in the height, nugget is formed when the portion to be welded is sandwiched by the fixing side and the pressing side electrodes at the time of welding. The nugget is formed at the points in contact with the two electrodes, and a weld zone with high joining strength can be obtained. The number of the bumps for projection welding is preferably 2 or more.

As the fixing side and the pressing side electrodes used for the formation of the welding structure of the present invention, welding electrodes having areas enough to press all of the bumps for projection welding may be used.

More specifically, an electrode with contact area in the range of 2×6 mm–4×10 mm (length×width) may be used as the fixing side electrode. As the pressing side electrode, an electrode with contact area in the range of 2×4 mm–4×6 mm (length×width) may be used.

When the electrode having larger contact area with the portion to be welded is used, heat will be radiated more satisfactorily compared with the case where an electrode with smaller diameter is used. Also, current density at the contact area with the portion to be welded will be lower, and this contributes to elimination or reduction of damage of the welding electrode due to heating or pressing force, and this also ensures longer service life of the electrode.

In the connecting structure of the present invention, the conductive connecting tab for negative electrode such as conductive connecting tab made of nickel may be applied for the connecting structure to the battery case or the battery housing made of nickel-plated soft steel or made of stainless steel. The conductive connecting tab made of aluminum used as the conductive connecting tab for positive electrode may be used for the formation of the connecting structure to the battery case made of aluminum or to inner surface of the battery housing made of aluminum.

In the following, description will be given on an example of the present invention.

EXAMPLE 1

To a conductive connecting tab made of nickel and mounted on the battery element and of 4 mm in width and 100 µm in thickness, two bumps for projection welding each with height of 0.3 mm were formed with a spacing of 2 mm. The height of the bumps for projection welding was defined as a distance from vertex of the bump to opposite surface of the conductive connecting tab.

The bump for projection welding of the conductive connecting tab was brought into contact with inner wall surface of the battery case made of nickel-plated soft steel, and a fixing side electrode of 3×8 mm (length×width) was brought into contact with outer wall surface. A pressing side electrode in size of 3×5 mm (length×width) was brought into contact with the conductive connecting tab. Then, pressure was applied at 60.8 N. Under the condition that electric current was 3 kA and energizing time was 6 ms, projection welding was performed.

On 50 samples obtained by the above welding, peeling test was carried out on the welded portion. Welding strength was 58.6 N in average. Nuggets were remaining on each of ruptured portions. Tear rupture showing rupture of the base material of the tab was found, and the weld zone showed satisfactory strength in all cases.

The electrodes made of alumina-dispersed copper used as the fixing side and the pressing side electrodes in the welding operation had no damage on the tips.

According to the present invention, the conductive connecting tab mounted on the battery element can be connected satisfactorily to inner wall surface of the battery case or to inner surface of the battery housing. It is also possible to extend the service life of the welding electrodes, and this contributes to more efficient production of the batteries.

What is claimed is:

1. A connecting structure of a conductive connecting tab of a battery, said conductive connecting tab made of nickel and mounted on a battery element and connected to an inner wall surface of a battery case, said connective structure comprising a plurality of bumps for projection welding of the conductive connecting tab, said plurality of bumps for projection welding are positioned face-to-face to the inner wall surface or the surface of the cover made of soft steel of the battery case and are bonded by projection welding.

2. A sealed battery, comprising bumps for projection welding of a conductive connecting tab made of nickel and mounted on a battery element, wherein said bumps for projection welding of the conductive connecting tab made of nickel are positioned face-to-face to an inner wall surface or a surface of a cover made of soft steel of a battery case, and a connecting portion of the tab is formed by projection welding.

3. A method for forming a connecting structure of a conductive connecting tab of a battery, said conductive connecting tab mounted on a battery element and bonded to an inner wall surface or to an inner surface of a cover of a battery case, said method comprising the steps of
forming a plurality of bumps for projection welding on the conductive connecting tab made of nickel,
providing a plurality of bumps for projection welding face-to-face to an inner wall surface or an inner surface of the cover made of soft steel of the battery case, and
supplying welding current under the condition that a pair of electrodes are pressed on welding points, said electrodes having contact areas larger than the portions where the plurality of bumps for projection welding are positioned.

4. A method for manufacturing a sealed battery, wherein a conductive connecting tab made of nickel and mounted on a battery element is bonded to an inner wall surface or connected to inner surface of a battery-case, said method comprising the steps of:
forming a plurality of bumps for projection welding on the conductive connecting tab,
providing a plurality of bumps for projection welding face-to-face to an inner wall surface or an inner surface of cover of the battery case, and
supplying welding current under the condition that a pair of electrodes are pressed on welding points, said electrodes having contact areas larger than the portions where the plurality of bumps for projection welding are positioned, and a connecting portion is formed by projection welding.

* * * * *